(12) United States Patent
Ma et al.

(10) Patent No.: US 12,129,610 B2
(45) Date of Patent: Oct. 29, 2024

(54) COMBINED PLATE-BEAM UNIT ANALYSIS METHOD CONSIDERING RESIDUAL STRESS EFFECT OF ORTHOTROPIC PLATE

(71) Applicant: South China University of Technology, Guangzhou (CN)

(72) Inventors: Niujing Ma, Guangzhou (CN); Ronghui Wang, Guangzhou (CN); Long Piao, Guangzhou (CN)

(73) Assignee: South China University of Technology, Guangzhou (CN)

( * ) Notice: Subject to any disclaimer, the term of this patent is extended or adjusted under 35 U.S.C. 154(b) by 799 days.

(21) Appl. No.: 17/355,466

(22) Filed: Jun. 23, 2021

(65) Prior Publication Data
US 2022/0127802 A1    Apr. 28, 2022

(30) Foreign Application Priority Data
Oct. 28, 2020    (CN) .......................... 202011176107.3

(51) Int. Cl.
*E01D 19/12* (2006.01)
*E01D 2/04* (2006.01)
*G01L 1/00* (2006.01)

(52) U.S. Cl.
CPC ............. *E01D 19/125* (2013.01); *E01D 2/04* (2013.01); *G01L 1/00* (2013.01)

(58) Field of Classification Search
CPC ............ E01D 2/04; E01D 19/125; G01L 1/00
See application file for complete search history.

(56) References Cited

U.S. PATENT DOCUMENTS

| | | | | |
|---|---|---|---|---|
| 6,490,745 B1 * | 12/2002 | Kim | ........................ | E01D 21/00 165/47 |
| 7,069,614 B1 * | 7/2006 | Sivachenko | .............. | E01D 2/00 52/579 |
| 8,453,406 B2 * | 6/2013 | Platt | ........................ | E04C 3/294 14/73.1 |
| 2004/0055249 A1 * | 3/2004 | Kennedy | ................. | B32B 15/06 52/794.1 |
| 2005/0257336 A1 * | 11/2005 | Reynolds | ............ | E04G 23/0218 14/13 |
| 2008/0190217 A1 * | 8/2008 | Laurent | ................... | E01D 19/16 73/862.451 |

(Continued)

*Primary Examiner* — Raymond W Addie
(74) *Attorney, Agent, or Firm* — The Dobrusin Law Firm, P.C.

(57) ABSTRACT

A combined plate-beam unit analysis method considering a residual stress effect of an orthotropic plate, which is used for analyzing an orthotropic steel bridge deck welded by a top plate of a bridge deck and a trapezoidal rib, the top plate of the bridge deck is analyzed by a flat shell unit, while each sub-plate forming a trapezoidal rib is analyzed by a plate-beam unit. The welding residual stress of a top plate and a trapezoidal rib is obtained by a residual stress self-balancing condition, and the initial deformation of a top plate and left and right web plates of a trapezoidal rib is obtained by the stress-strain relationship. The combined plate-beam unit analysis method has the advantages of less freedom and high calculation accuracy, so it is especially suitable for structural analysis of the trapezoidal rib orthotropic plates.

1 Claim, 4 Drawing Sheets

(56) References Cited

U.S. PATENT DOCUMENTS

| | | | |
|---|---|---|---|
| 2009/0077758 A1* | 3/2009 | Vincent | E01D 22/00 14/73 |
| 2010/0170050 A1* | 7/2010 | Inose | B23K 35/3053 219/76.1 |
| 2013/0263392 A1* | 10/2013 | Han | E01D 19/02 14/74.5 |
| 2015/0198502 A1* | 7/2015 | Phares | G01M 5/0008 702/42 |

* cited by examiner

COMBINED PLATE-BEAM UNIT ANALYSIS METHOD CONSIDERING RESIDUAL STRESS EFFECT OF ORTHOTROPIC PLATE

CROSS REFERENCE TO RELATED APPLICATION(S)

This patent application claims the benefit and priority of Chinese Patent Application No. 202011176107.3, filed on Oct. 28, 2020, the disclosure of which is incorporated by reference herein in its entirety as part of the present application.

TECHNICAL FIELD

The present disclosure relates to the technical field of welding, in particular to a combined plate-beam unit analysis method considering a residual stress effect of an orthotropic plate.

BACKGROUND

The orthotropic steel deck is widely used in long-span bridges. It is of great theoretical significance and engineering value to analyze its mechanical properties accurately and deeply. In recent years, many scholars regard the stiffening rib of the orthotropic steel bridge deck as a conventional rectangular section, or analyze it according to stiffness equivalence. In fact, the orthotropic steel bridge deck, especially the trapezoidal rib orthotropic steel bridge deck, has a large number of plates and complex stress. If the stiffening ribs consisted of several plates are simply studied according to the stiffness equivalent method, the research results will inevitably lead to some deviation from the actual situation. Relatively speaking, the finite unit analysis method can overcome such shortcomings and make accurate and effective quantitative research on the mechanical properties of the orthotropic steel bridge deck.

Based on this, the present disclosure designs a combined plate-beam unit analysis method considering a residual stress effect of an orthotropic plate, which is used for analyzing an orthotropic steel bridge deck welded by a top plate of a bridge deck and a trapezoidal rib, wherein the top plate of the bridge deck is analyzed by a flat shell unit, while each sub-plate forming a trapezoidal rib is analyzed by a plate-beam unit. The welding residual stress of a top plate and a trapezoidal rib is obtained by a residual stress self-balancing condition, and the initial deformation of a top plate and left and right web plates of a trapezoidal rib is obtained by the stress-strain relationship. The combined plate-beam unit analysis method has the advantages of less freedom and high calculation accuracy, so it is especially suitable for structural analysis of the trapezoidal rib orthotropic plates.

SUMMARY

The purpose of the present disclosure is to provide a combined plate-beam unit analysis method considering the residual stress effect of an orthotropic plate to solve the above problems.

In order to achieve the above purpose, the present disclosure provides the following technical scheme: a combined plate-beam unit analysis method considering a residual stress effect of an orthotropic plate, comprising the steps of:

S1, an analysis object serving as an orthotropic steel bridge deck welded by a top plate of a bridge deck and a trapezoidal rib, wherein the trapezoidal rib orthotropic plate is discretized into a combined plate-beam unit, the top plate is analyzed by a flat shell unit, and each sub-plate forming the trapezoidal rib is analyzed by a plate-beam unit;

S2: the top plate having four nodes 1, 2, 3 and 4, wherein the analysis of the top plate is superimposed by the plane stress problem and the thin plate bending problem with small deflection, and each node has five degrees of freedom, including the linear displacement degrees of freedom u and v corresponding to the plane stress problem, and the linear displacement and the rotational angle degrees of freedom w, $\theta_x$ and $\theta_y$ corresponding to the thin plate bending problem with small deflection, establishing a displacement array of top plate nodes of the combined plate-beam unit;

$$\delta = [\delta_1 \delta_2 \delta_3 \delta_4]^T \quad (1),$$

where $\delta_i = [u_i\ v_i\ w_i\ \theta_{xi}\ \theta_{yi}]$ (i=1,2,3,4);

S3: each plate-beam sub-unit forming the trapezoidal rib in mn section having the axial displacement adopting the first-order polynomial in the longitudinal direction and the vertical displacement adopting the third-order polynomial in the longitudinal direction, wherein the interpolation functions are as follows:

$$\begin{aligned} m &= [m_1\ m_2] \\ m_1 &= 1 - \zeta \\ m_2 &= \zeta \end{aligned} \quad (2)$$

$$\begin{aligned} n &= [n_1\ n_2\ n_3\ n_4] \\ n_1 &= 1 - 3\zeta^2 + 2\zeta^3 \\ n_2 &= (\zeta - 2\zeta^2 + \zeta^3)d \\ n_3 &= 3\zeta^2 - 2\zeta^3 \\ n_4 &= (-\zeta^2 + 3\zeta^3)d \end{aligned} \quad (3)$$

where $$\zeta = \frac{x}{d},$$

d is the length of the trapezoidal rib in mn section;

S4: obtaining the displacement of each node of the trapezoidal rib according to the deformation coordination condition between the top plate and the trapezoidal rib, and obtaining the longitudinal displacement of the trapezoidal rib nodes 7 and 8 by combining the cross-sectional size and displacement parameters of the combined plate-beam unit and the displacement field of the plane stress unit:

$$u_7 = \frac{1}{2}\left(1 - \frac{a}{k}\right)u_1 + \frac{1}{2}\left(1 + \frac{a}{k}\right)u_4, \quad (4)$$

$$u_8 = \frac{1}{2}\left(1 + \frac{a}{k}\right)u_1 + \frac{1}{2}\left(1 - \frac{a}{k}\right)u_4, \quad (5)$$

the rotation angles of nodes 7 and 8 around y axis are:

$$\theta_{y7} = \frac{1}{2}\left(1 - \frac{a}{k}\right)\theta_{y1} + \frac{1}{2}\left(1 + \frac{a}{k}\right)\theta_{y4}, \quad (6)$$

-continued $$\theta_{y8} = \frac{1}{2}\left(1 + \frac{a}{k}\right)\theta_{y1} + \frac{1}{2}\left(1 - \frac{a}{k}\right)\theta_{y4}, \quad (7)$$

where a is the distance between the upper ends of a trapezoidal rib web plate; k is the width of the top plate of the combined plate-beam unit;

obtaining the vertical displacement of nodes 7 and 8 in combination with the displacement field of thin plate bending with small deflection:

$$w_7 = \frac{1}{4}\left(1 - \frac{a}{k}\right)\left[2 - \frac{a}{k} - \left(\frac{a}{k}\right)^2\right]w_1 + \frac{k}{8}\left(1 - \frac{a}{k}\right)\left[1 - \left(\frac{a}{k}\right)^2\right]\theta_{x1} + \quad (8)$$
$$\frac{1}{4}\left(1 + \frac{a}{k}\right)\left[2 + \frac{a}{k} - \left(\frac{a}{k}\right)^2\right]w_4 - \frac{k}{8}\left(1 + \frac{a}{k}\right)\left[1 - \left(\frac{a}{k}\right)^2\right]\theta_{x4},$$

$$w_8 = \frac{1}{4}\left(1 + \frac{a}{k}\right)\left[2 + \frac{a}{k} - \left(\frac{a}{k}\right)^2\right]w_1 + \frac{k}{8}\left(1 + \frac{a}{k}\right)\left[1 - \left(\frac{a}{k}\right)^2\right]\theta_{x1} + \quad (9)$$
$$\frac{1}{4}\left(1 - \frac{a}{k}\right)\left[2 - \frac{a}{k} - \left(\frac{a}{k}\right)^2\right]w_4 - \frac{k}{8}\left(1 - \frac{a}{k}\right)\left[1 - \left(\frac{a}{k}\right)^2\right]\theta_{x4},$$

S5: considering the same rotation angle of each section, without considering the extrusion of longitudinal fibers of a plate-beam sub-unit, wherein the rotation angles of left and right web plates at m end around y axis are the same as those of nodes 8 and 7 around y axis, respectively, and the rotation angle of the bottom plate center around y axis is linearly interpolated between nodes 5 and 6, namely:

$$\theta_{lcm} = \frac{1}{2}\left(1 + \frac{a}{k}\right)\theta_{y1} + \frac{1}{2}\left(1 - \frac{a}{k}\right)\theta_{y4}, \quad (10)$$

$$\theta_{rcm} = \frac{1}{2}\left(1 - \frac{a}{k}\right)\theta_{y1} + \frac{1}{2}\left(1 + \frac{a}{k}\right)\theta_{y4}, \quad (11)$$

$$\theta_{bcm} = \frac{1}{2}\theta_{lcm} + \frac{1}{2}\theta_{rcm}, \quad (12)$$

S6: obtaining the displacement mode of the m end, wherein the longitudinal displacement at the centroid of the left and right web plates at the m end is:

$$u_{lcm} = u_8 - \frac{h}{2}\theta_{lcm}, \quad (13)$$

$$u_{rcm} = u_7 - \frac{h}{2}\theta_{rcm}, \quad (14)$$

where h is the height of a trapezoidal rib web plate;
the longitudinal displacement of nodes 5 and 6 is:

$$u_5 = u_8 - h\theta_{lcm} \quad (15),$$

$$u_6 = u_7 - h\theta_{rcm} \quad (16),$$

linear interpolation is performed between nodes 5 and 6 to obtain the longitudinal displacement at the centroid of the bottom plate at the m end:

$$u_{bcm} = \frac{1}{2}u_5 + \frac{1}{2}u_6 \quad (17),$$

the vertical displacement of the left and right web plates at the m end at the centroid is expressed as:

$$w_{lcm} = w_8 \quad (18),$$

$$w_{rcm} = w_7 \quad (19),$$

linear interpolation is performed between nodes 5 and 6 to obtain the vertical displacement at the centroid of the bottom plate at the m end:

$$w_{bcm} = \frac{1}{2}w_{lcm} + \frac{1}{2}w_{rcm} \quad (20);$$

S7: obtaining the displacement mode of the n end according to the method of obtaining the displacement mode of the m end in S6;

S8: obtaining the longitudinal and vertical displacements of the left web plate and the bottom plate, wherein the node displacement parameters of longitudinal and vertical displacements at the centroid of the left web plate-beam sub-unit are expressed by $u_l^*$ and $w_l^*$, respectively:

$$u_l^* = [u_{lcm} u_{lcn}]^T \quad (21),$$

$$w_l^* = [w_{lcm} \theta_{lcm} w_{lcn} \theta_{lcn}]^T \quad (22),$$

the longitudinal and vertical displacements are:

$$u_{lc} = nu_l^* = nA\delta \quad (23),$$

$$w_{lc} = mw_l^* = nB\delta \quad (24),$$

where A is the transformation matrix of $u_l^*$ and $\delta$; B is the transformation matrix of $w_l^*$ and $\delta$;

S9: obtaining the longitudinal and vertical displacements of the right web plate and the bottom plate according to the method of obtaining the longitudinal and vertical displacements of the left web plate and the bottom plate in S8;

S10: obtaining the stiffness matrix of the trapezoidal rib by using the potential energy variational method according to the displacement modes of each plate-beam sub-unit of the trapezoidal rib obtained in S4 to S9:

$$\Pi = \Pi_q + \Pi_l + \Pi_r + \Pi_b - F^{eT}\delta \quad (25),$$

where: $\Pi_q$ is the strain energy of a top plate unit; $\Pi_l$, $\Pi_r$, and $\Pi_b$ are the strain energy of the left and right web plates and the bottom plate unit of the trapezoidal rib, respectively; $F^{eT}$ is an external force load array;

the strain energy of the left and right web plates and the bottom plate unit of the trapezoidal rib is expressed as:

$$\Pi_l = \frac{1}{2}\int_0^d EA_l(n'u_l^*)^2 dx + \frac{1}{2}\int_0^d EI_{yl}(m'w_l^*)^2 dx = \frac{1}{2}\delta^T K_l^e \delta \quad (26),$$

$$\Pi_r = \frac{1}{2}\int_0^d EA_r(n'u_r^*)^2 dx + \frac{1}{2}\int_0^d EI_{yr}(m'w_r^*)^2 dx = \frac{1}{2}\delta^T K_r^e \delta \quad (27),$$

$$\Pi_b = \frac{1}{2}\int_0^d EA_b(n'u_b^*)^2 dx + \frac{1}{2}\int_0^d EI_{yb}(m'w_b^*)^2 dx = \frac{1}{2}\delta^T K_b^e \delta \quad (28),$$

where: $K_l^e$, $EA_l$ and $EI_{yl}$ are the stiffness matrix, the axial stiffness and the vertical bending stiffness of the left web plate of the trapezoidal rib, respectively; $K_r^e$, $EA_r$ and $EI_{yr}$ are the stiffness matrix, the axial stiffness and the vertical bending stiffness of the right web plate of the trapezoidal rib respectively; $K_b^e$, $EA_b$ and $EI_{yb}$ are the stiffness matrix, the axial stiffness and the vertical bending stiffness of the bottom plate of the trapezoidal rib, respectively;

S11: assuming that the residual stress in the top plate along the x direction is a constant $\sigma_{px0}$, and the longitudinal residual stress $\sigma_{sx(z)}$ of the trapezoidal rib gradually changes from $\sigma_{px0}$ to $\sigma_{sx0}$ along the z direction, according to the self-balance condition of the residual stress, obtaining:

$$\frac{1}{2}tk\sigma_{px0} + t_1 \int_0^{g_1} \frac{l}{g_1}\sigma_{px0}dl - t_1 \int_0^{g_2} \frac{l}{g_2}\sigma_{sx0}dl = 0, \quad (29)$$

according to formula (29), g1 and g2 is obtained from the residual stresses $\sigma_{px0}$ and $\sigma_{sx0}$, and g1 and g2 represent the distribution width of the residual stresses in two directions, respectively, for the top plate, the initial deformation of the top plate is obtained by substituting the residual stress $\sigma_{px0}$ into the stress matrix of the plane strain unit, for the trapezoidal rib, the initial deformation of the left and right web plates is obtained by combining the stiffness matrix and the residual stress distribution of the left and right web plates, wherein the stiffness matrix of the left web plate is $K_l^e$, the stiffness matrix of the right web plate is $K_r^e$, and the residual stress is $\sigma_{sx(z)}$.

Compared with the prior art, the present disclosure has the following beneficial effects.

The method is used for analyzing a combined plate-beam unit of a top plate of a bridge deck and a trapezoidal rib, wherein the top plate of the bridge deck is analyzed by a flat shell unit, while each sub-plate forming a trapezoidal rib is analyzed by a plate-beam unit. The combined plate-beam unit analysis method has the advantages of less freedom and high calculation accuracy, so it is especially suitable for structural analysis of the trapezoidal rib orthotropic plates. In addition, for bridge deck pavement, an 8-node solid plate unit is constructed to simulate the pavement, and the linear change of vertical displacement is considered. In the analysis, the complete continuity between the pavement and the bridge deck is considered. The introduction of the solid plate unit not only reduces the number of unit divisions and improves the calculation efficiency, but also meets the requirements of calculation accuracy.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

DETAILED DESCRIPTION

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

Taking the steel box girder trapezoidal rib orthotropic bridge deck of the river-sea direct passage of Hong Kong-Zhuhai-Macao Bridge as the engineering background, the present disclosure provides a combined plate-beam unit analysis method considering a residual stress effect of an orthotropic plate, which is used for analyzing an orthotropic steel bridge deck welded by a top plate of a bridge deck and a trapezoidal rib, wherein the top plate of the bridge deck is analyzed by a flat shell unit, while each sub-plate forming a trapezoidal rib is analyzed by a plate-beam unit. The welding residual stress of a top plate and a trapezoidal rib is obtained by a residual stress self-balancing condition, and the initial deformation of a top plate and left and right web plates of a trapezoidal rib is obtained by the stress-strain relationship. The combined plate-beam unit analysis method has the advantages of less freedom and high calculation accuracy, so it is especially suitable for structural analysis of the trapezoidal rib orthotropic plates.

Figure 1:
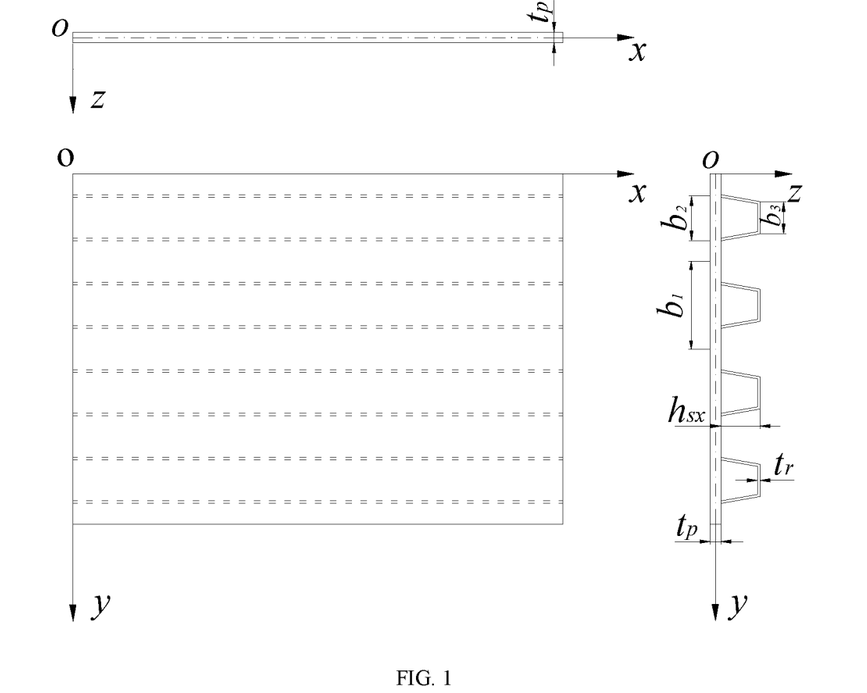
FIG. 1 is a structural diagram of a trapezoidal rib stiffening plate according to the present disclosure.

The river-sea direct navigation channel bridge of the navigation hole of Hong Kong-Zhuhai-Macao Bridge is a cable-stayed bridge with three-tower steel box girder in the center. The standard section of the main span is in the form of a whole box with a standard section length of 15 m and a total of 54 sections. The section of the whole box is in the form of a single box with three rooms with long cantilevers on both sides. The top plate width of the box girder is 38.8 m, the bottom width is 20.7 m, the beam height is 4.5 m and the cantilever length is 5.675 m. The standard thickness of the top plate is 18 mm, and the stiffening rib of the top plate is in the form of a trapezoidal rib with higher stiffness. The rib thickness is 8 mm, the standard section rib height is 300 mm, the upper opening width is 300 mm, the lower opening width is 180 mm, the standard distance across the bridge direction is 600 mm, and the bridge deck pavement thickness is 70 mm. The bridge deck structure is shown in FIG. 1. The material and geometric parameters corresponding to the trapezoidal rib stiffening plate shown in FIG. 1 are: $\rho$=7850 kg/m3, E=206 GPa, $\mu$=0.3, $b_1$=0.6 m, $b_2$=0.3 m, $b_3$=0.18 m, $h_{sx}$=0.3 m, $t_r$=0.008 m, $t_p$=0.018 m.

Figure 2:
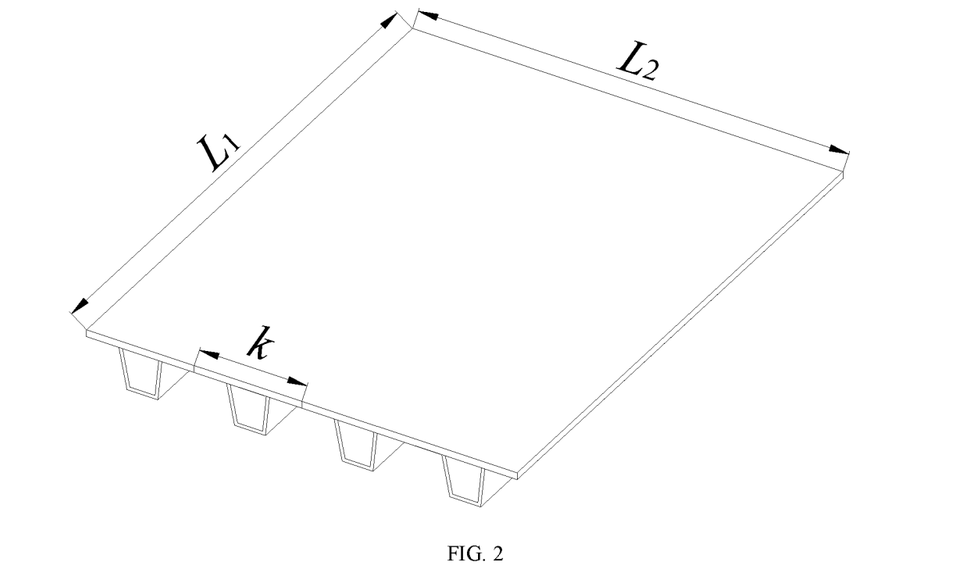
FIG. 2 is a schematic diagram of calculating a trapezoidal rib stiffening plate according to the present disclosure.

The present disclosure provides a technical scheme that a combined plate-beam unit analysis method considering a residual stress effect of an orthotropic plate comprises the steps of:

S1: as shown in FIG. 1 and FIG. 2, an analysis object serves as an orthotropic steel bridge deck welded by a top plate of a bridge deck and a trapezoidal rib. The trapezoidal rib orthotropic plate shown in FIG. 2 is discretized into a combined plate-beam unit shown in FIG. 3. The top plate is analyzed by a flat shell unit, and each sub-plate forming the trapezoidal rib is analyzed by a plate-beam unit.

Figure 3:
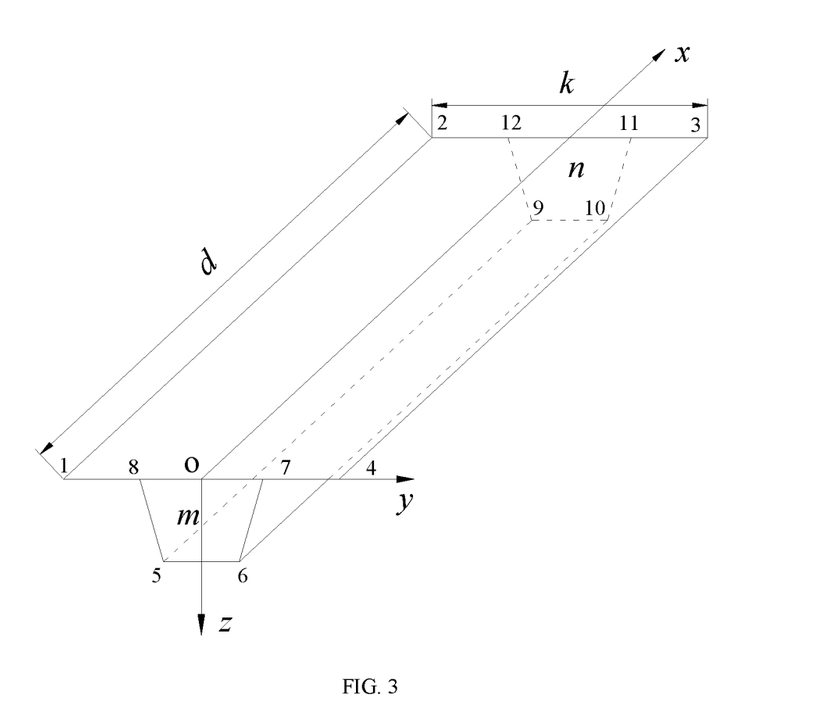
FIG. 3 is a schematic structural diagram of a combined plate-beam unit according to the present disclosure.

S2: as shown in FIG. 3, the top plate has four nodes 1, 2, 3 and 4, wherein the analysis of the top plate is superimposed by the plane stress problem and the thin plate bending problem with small deflection, and each node has five degrees of freedom, including the linear displacement degrees of freedom u and v corresponding to the plane stress problem, and the linear displacement and the rotational angle degrees of freedom w, $\theta_x$ and $\theta_y$ corresponding to the thin plate bending problem with small deflection, A displacement array of top plate nodes of the combined plate-beam unit is established:

$$\delta=[\delta_1 \delta_2 \delta_3 \delta_4]^T \qquad (1),$$

where $\delta_i=[u_i\ v_i\ w_i\ \theta_{xi}\ \theta_{yi}]$ (i=1,2,3,4).

The displacement mode of the trapezoidal rib is obtained.

Because all the plates forming trapezoidal ribs are stressed together and are similar to the stress characteristics of a beam unit, they can be regarded as plate-beam sub-units for analysis. At the same time, the main function of the trapezoidal rib is to improve the vertical bending stiffness of the top plate, so that the analysis in the present disclosure only considers the vertical and longitudinal displacements of each plate-beam sub-unit.

S3: as shown in FIG. 3, each plate-beam sub-unit forming the trapezoidal rib in mn section has the axial displacement adopting the first-order polynomial in the longitudinal direction and the vertical displacement adopting the third-order polynomial in the longitudinal direction, wherein the interpolation functions are as follows:

$$m = [m_1 \ m_2] \\ m_1 = 1 - \zeta \\ m_2 = \zeta$$
(2)

$$n = [n_1 \ n_2 \ n_3 \ n_4] \\ n_1 = 1 - 3\zeta^2 + 2\zeta^3 \\ n_2 = (\zeta - 2\zeta^2 + \zeta^3)d \\ n_3 = 3\zeta^2 - 2\zeta^3 \\ n_4 = (-\zeta^2 + \zeta^3)d$$
(3)

where $$\zeta = \frac{x}{d},$$

d is the length of the trapezoidal rib in mn section.

Figure 4:
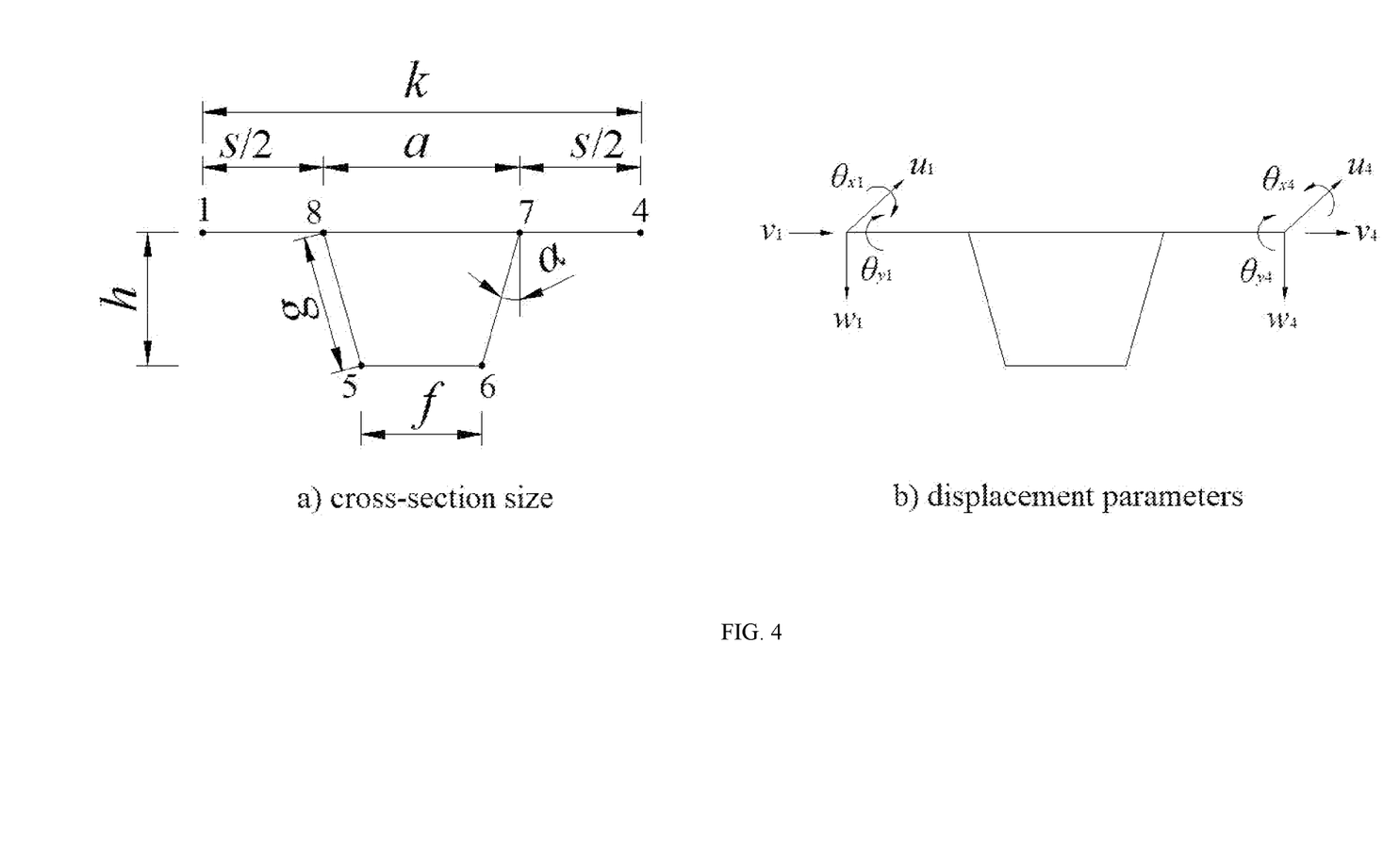
FIG. 4 is a schematic diagram of cross-sectional dimensions (a) and displacement parameters (b) of a combined plate-beam unit.

S4: the displacement of each node of the trapezoidal rib is obtained according to the deformation coordination condition between the top plate and the trapezoidal rib, and the longitudinal displacement of the trapezoidal rib nodes 7 and 8 is obtained by combining the cross-sectional size (a) and displacement parameters (b) of the combined plate-beam unit and the displacement field of the plane stress unit shown in FIG. 4:

$$u_7 = \frac{1}{2}\left(1 - \frac{a}{k}\right)u_1 + \frac{1}{2}\left(1 + \frac{a}{k}\right)u_4,$$
(4)

$$u_8 = \frac{1}{2}\left(1 + \frac{a}{k}\right)u_1 + \frac{1}{2}\left(1 - \frac{a}{k}\right)u_4,$$
(5)

where a is the distance between the upper ends of a trapezoidal rib web plate; k is the width of the top plate of the combined plate-beam unit;

the rotation angles of nodes 7 and 8 around y axis are:

$$\theta_{y7} = \frac{1}{2}\left(1 - \frac{a}{k}\right)\theta_{y1} + \frac{1}{2}\left(1 + \frac{a}{k}\right)\theta_{y4},$$
(6)

$$\theta_{y8} = \frac{1}{2}\left(1 + \frac{a}{k}\right)\theta_{y1} + \frac{1}{2}\left(1 - \frac{a}{k}\right)\theta_{y4},$$
(7)

the vertical displacement of nodes 7 and 8 is obtained in combination with the displacement field of thin plate bending with small deflection:

$$w_7 = \frac{1}{4}\left(1 - \frac{a}{k}\right)\left[2 - \frac{a}{k} - \left(\frac{a}{k}\right)^2\right]w_1 + \frac{k}{8}\left(1 - \frac{a}{k}\right)\left[1 - \left(\frac{a}{k}\right)^2\right]\theta_{x1} + \\ \frac{1}{4}\left(1 + \frac{a}{k}\right)\left[2 + \frac{a}{k} - \left(\frac{a}{k}\right)^2\right]w_4 - \frac{k}{8}\left(1 + \frac{a}{k}\right)\left[1 - \left(\frac{a}{k}\right)^2\right]\theta_{x4},$$
(8)

$$w_8 = \frac{1}{4}\left(1 + \frac{a}{k}\right)\left[2 + \frac{a}{k} - \left(\frac{a}{k}\right)^2\right]w_1 + \frac{k}{8}\left(1 + \frac{a}{k}\right)\left[1 - \left(\frac{a}{k}\right)^2\right]\theta_{x1} + \\ \frac{1}{4}\left(1 - \frac{a}{k}\right)\left[2 - \frac{a}{k} - \left(\frac{a}{k}\right)^2\right]w_4 - \frac{k}{8}\left(1 - \frac{a}{k}\right)\left[1 - \left(\frac{a}{k}\right)^2\right]\theta_{x4}.$$
(9)

S5: considering the same rotation angle of each section, without considering the extrusion of longitudinal fibers of a plate-beam sub-unit, the rotation angles of left and right web plates at m end around y axis are the same as those of nodes 8 and 7 around y axis, respectively, and the rotation angle of the bottom plate center around y axis is linearly interpolated between nodes 5 and 6, namely:

$$\theta_{lcm} = \frac{1}{2}\left(1 + \frac{a}{k}\right)\theta_{y1} + \frac{1}{2}\left(1 - \frac{a}{k}\right)\theta_{y4},$$
(10)

$$\theta_{rcm} = \frac{1}{2}\left(1 - \frac{a}{k}\right)\theta_{y1} + \frac{1}{2}\left(1 + \frac{a}{k}\right)\theta_{y4},$$
(11)

$$\theta_{bcm} = \frac{1}{2}\theta_{lcm} + \frac{1}{2}\theta_{rcm}.$$
(12)

S6: the displacement mode of the m end is obtained, wherein the longitudinal displacement at the centroid of the left and right web plates at them end is:

$$u_{lcm} = u_8 - \frac{h}{2}\theta_{lcm},$$
(13)

$$u_{rcm} = u_7 - \frac{h}{2}\theta_{rcm},$$
(14)

where h is the height of a trapezoidal rib web plate; the longitudinal displacement of nodes 5 and 6 is:

$$u_5 = u_8 - h\theta_{lcm}$$
(15), $$u_6 = u_7 - h\theta_{rcm}$$
(16), linear interpolation is performed between nodes 5 and 6 to obtain the longitudinal displacement at the centroid of the bottom plate at the m end:

$$u_{bcm} = \tfrac{1}{2}u_5 + \tfrac{1}{2}u_6$$
(17), the vertical displacement of the left and right web plates at the m end at the centroid is expressed as:

$$w_{lcm} = w_8$$
(18), $$w_{rcm} = w_7$$
(19), linear interpolation is performed between nodes 5 and 6 to obtain the vertical displacement at the centroid of the bottom plate at the m end:

$$w_{bcm} = \tfrac{1}{2}w_{lcm} + \tfrac{1}{2}w_{rcm}$$
(20).

S7: the displacement mode of the n end is obtained according to the method of obtaining the displacement mode of the m end in S6.

S8: the longitudinal and vertical displacements of the left web plate and the bottom plate is obtained, wherein the node displacement parameters of longitudinal and vertical displacements at the centroid of the left web plate-beam sub-unit are expressed by $u_l^*$ and $w_l^*$, respectively:

$$u_l^* = [u_{lcm} u_{lcn}]^T \quad (21),$$

$$w_l^* = [w_{lcm} \theta_{lcm} w_{lcn} \theta_{lcn}]^T \quad (22),$$

the longitudinal and vertical displacements are:

$$u_{lc} = n u_l^* = nA\delta \quad (23),$$

$$w_{lc} = m w_l^* = nB\delta \quad (24),$$

where A is the transformation matrix of $u_l^*$ and $\delta$; B is the transformation matrix of $w_l^*$ and $\delta$.

S9: the longitudinal and vertical displacements of the right web plate and the bottom plate are obtained according to the method of obtaining the longitudinal and vertical displacements of the left web plate and the bottom plate in S8.

S10: the stiffness matrix of the trapezoidal rib is obtained by using the potential energy variational method according to the displacement modes of each plate-beam sub-unit of the trapezoidal rib obtained in S4 to S9:

$$\Pi = \Pi_q + \Pi_l + \Pi_r + \Pi_b - F^{eT}\delta \quad (25),$$

where: $\Pi_q$ is the strain energy of a top plate unit; $\Pi_l$, $\Pi_r$, and $\Pi_b$ are the strain energy of the left and right web plates and the bottom plate unit of the trapezoidal rib, respectively; $F^{eT}$ is an external force load array;

the strain energy of the left and right web plates and the bottom plate unit of the trapezoidal rib is expressed as:

$$\Pi_l = \tfrac{1}{2}\int_0^d EA_l(n'u_l^*)^2 dx + \tfrac{1}{2}\int_0^d EI_{yl}(m'w_l^*)^2 dx = \tfrac{1}{2}\delta^T K_l^e \delta \quad (26),$$

$$\Pi_r = \tfrac{1}{2}\int_0^d EA_r(n'u_r^*)^2 dx + \tfrac{1}{2}\int_0^d EI_{yr}(m'w_r^*)^2 dx = \tfrac{1}{2}\delta^T K_r^e \delta \quad (27),$$

$$\Pi_b = \tfrac{1}{2}\int_0^d EA_b(n'u_b^*)^2 dx + \tfrac{1}{2}\int_0^d EI_{yb}(m'w_b^*)^2 dx = \tfrac{1}{2}\delta^T K_b^e \delta \quad (28),$$

where: $K_l^e$, $EA_l$ and $EI_{yl}$ are the stiffness matrix, the axial stiffness and the vertical bending stiffness of the left web plate of the trapezoidal rib, respectively; $K_r^e$, $EA_r$ and $EI_{yr}$ are the stiffness matrix, the axial stiffness and the vertical bending stiffness of the right web plate of the trapezoidal rib respectively; $K_b^e$, $EA_b$ and $EI_{yb}$ are the stiffness matrix, the axial stiffness and the vertical bending stiffness of the bottom plate of the trapezoidal rib, respectively.

The actual welding residual stress distribution of the orthotropic steel bridge deck is very complex, but its transverse distribution has little influence. The influence of the longitudinal residual stress is mainly considered in practical engineering. Therefore, it can be simplified in structural analysis, which is approximately distributed as shown in FIG. 5.

Figure 5:
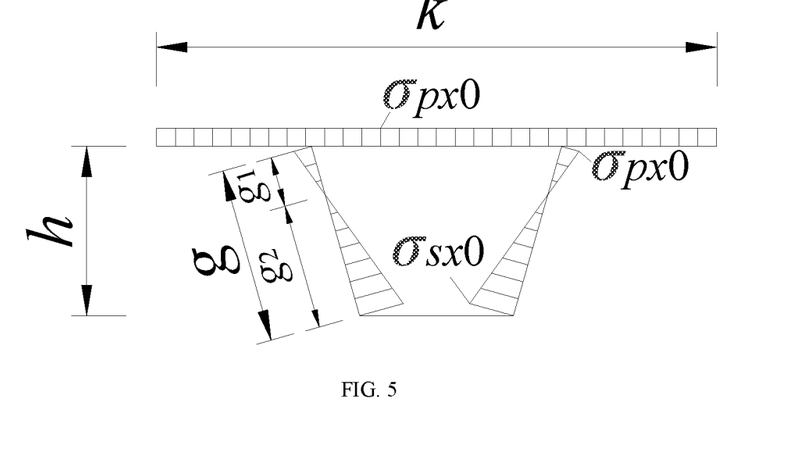
FIG. 5 is a distribution diagram of the welding residual stress of a trapezoidal rib stiffening plate according to the present disclosure.

S11: as shown in FIG. 5, it is assumed that the residual stress in the top plate along the x direction is a constant $\sigma_{px0}$, and the longitudinal residual stress $\sigma_{sx(z)}$ of the trapezoidal rib gradually changes from $\sigma_{px0}$ to $\sigma_{sx0}$ along the z direction, according to the self-balance condition of the residual stress, it is obtained that:

$$\tfrac{1}{2} tk\sigma_{px0} + t_1 \int_0^{g_1} \frac{l}{g_1}\sigma_{px0} dl - t_1 \int_0^{g_2} \frac{l}{g_2}\sigma_{sx0} dl = 0, \quad (29)$$

according to formula (29), g1 and g2 is obtained from the residual stresses $\sigma_{px0}$ and $\sigma_{sx0}$, and g1 and g2 represent the distribution width of the residual stresses in two directions, respectively.

For the top plate, the initial deformation of the top plate is obtained by substituting the residual stress $\sigma_{px0}$ into the stress matrix of the plane strain unit, wherein the stress matrix of the plane strain unit is a general matrix, which can be consulted from various books of Finite Unit Method.

For the trapezoidal rib, the initial deformation of the left and right web plates is obtained by combining the stiffness matrix and the residual stress distribution of the left and right web plates, wherein the stiffness matrix of the left web plate is $K_l^e$, the stiffness matrix of the right web plate is $K_r^e$, and the residual stress is $\sigma_{sx(z)}$.

In the description of this specification, description with reference to the terms "one embodiment", "example", "specific example", etc. means that specific features, structures, materials or characteristics described in connection with this embodiment or example are included in at least one embodiment or example of the present disclosure. In this specification, the schematic expressions of the above terms do not necessarily refer to the same embodiments or examples. Furthermore, the specific features, structures, materials or characteristics described may be combined in any one or more embodiments or examples in a suitable manner.

The preferred embodiments of the present disclosure disclosed above are only used to help illustrate the present disclosure. The preferred embodiment does not describe all the details in detail, nor does it limit the present disclosure to only the specific embodiment. Obviously, many modifications and variations can be made according to the content of this specification. These embodiments are selected and described in detail in this specification, in order to better explain the principle and practical application of the present disclosure, so that those skilled in the art can understand and utilize the present disclosure well. The present disclosure is limited only by the claims and their full scope and equivalents.

What is claimed is:

1. A combined plate-beam unit analysis method considering a residual stress effect of an orthotropic plate, comprising the steps of:

S1, an analysis object serving as an orthotropic steel bridge deck welded by a top plate of a bridge deck and a trapezoidal rib, wherein the trapezoidal rib orthotropic plate is discretized into a combined plate-beam unit, the top plate is analyzed by a flat shell unit, and each sub-plate forming the trapezoidal rib is analyzed by a plate-beam unit;

S2: the top plate having four nodes 1, 2, 3 and 4, wherein the analysis of the top plate is superimposed by the plane stress problem and the thin plate bending problem with small deflection, and each node has five degrees of freedom, including the linear displacement degrees of freedom u and v corresponding to the plane stress problem, and the linear displacement and the rotational angle degrees of freedom w, $\theta_x$ and $\theta_y$ corresponding to the thin plate bending problem with small deflection, establishing a displacement array of top plate nodes of the combined plate-beam unit;

$$\delta = [\delta_1 \delta_2 \delta_3 \delta_4]^T \quad (1),$$

where $\delta_i = [u_i\ v_i\ w_i\ \theta_{xi}\ \theta_{yi}]$ (i=1,2,3,4);

S3: each plate-beam sub-unit forming the trapezoidal rib in mn section having the axial displacement adopting the first-order polynomial in the longitudinal direction and the vertical displacement adopting the third-order polynomial in the longitudinal direction, wherein the interpolation functions are as follows:

$$m = [m_1\ m_2]​​​\\ m_1 = 1 - \zeta \\ m_2 = \zeta \quad (2)$$

$$n = [n_1\ n_2\ n_3\ n_4] \\ n_1 = 1 - 3\zeta^2 + 2\zeta^3 \\ n_2 = (\zeta - 2\zeta^2 + \zeta^3)d \\ n_3 = 3\zeta^2 - 2\zeta^3 \\ n_4 = (-\zeta^2 + \zeta^3)d \quad (3)$$

where $$\zeta = \frac{x}{d},$$

d is the length of the trapezoidal rib in mn section;

S4: obtaining the displacement of each node of the trapezoidal rib according to the deformation coordination condition between the top plate and the trapezoidal rib, and obtaining the longitudinal displacement of the trapezoidal rib nodes 7 and 8 by combining the cross-sectional size and displacement parameters of the combined plate-beam unit and the displacement field of the plane stress unit:

$$u_7 = \frac{1}{2}\left(1 - \frac{a}{k}\right)u_1 + \frac{1}{2}\left(1 + \frac{a}{k}\right)u_4, \quad (4)$$

$$u_8 = \frac{1}{2}\left(1 + \frac{a}{k}\right)u_1 + \frac{1}{2}\left(1 - \frac{a}{k}\right)u_4, \quad (5)$$

where a is the distance between the upper ends of a trapezoidal rib web plate; k is the width of the top plate of the combined plate-beam unit;

the rotation angles of nodes 7 and 8 around y axis are:

$$\theta_{y7} = \frac{1}{2}\left(1 - \frac{a}{k}\right)\theta_{y1} + \frac{1}{2}\left(1 + \frac{a}{k}\right)\theta_{y4}, \quad (6)$$

$$\theta_{y8} = \frac{1}{2}\left(1 + \frac{a}{k}\right)\theta_{y1} + \frac{1}{2}\left(1 - \frac{a}{k}\right)\theta_{y4}, \quad (7)$$

obtaining the vertical displacement of nodes 7 and 8 in combination with the displacement field of thin plate bending with small deflection:

$$w_7 = \frac{1}{4}\left(1 - \frac{a}{k}\right)\left[2 - \frac{a}{k} - \left(\frac{a}{k}\right)^2\right]w_1 + \frac{k}{8}\left(1 - \frac{a}{k}\right)\left[1 - \left(\frac{a}{k}\right)^2\right]\theta_{x1} + \\ \frac{1}{4}\left(1 + \frac{a}{k}\right)\left[2 + \frac{a}{k} - \left(\frac{a}{k}\right)^2\right]w_4 - \frac{k}{8}\left(1 + \frac{a}{k}\right)\left[1 - \left(\frac{a}{k}\right)^2\right]\theta_{x4}, \quad (8)$$

$$w_8 = \frac{1}{4}\left(1 + \frac{a}{k}\right)\left[2 + \frac{a}{k} - \left(\frac{a}{k}\right)^2\right]w_1 + \frac{k}{8}\left(1 + \frac{a}{k}\right)\left[1 - \left(\frac{a}{k}\right)^2\right]\theta_{x1} + \\ \frac{1}{4}\left(1 - \frac{a}{k}\right)\left[2 - \frac{a}{k} - \left(\frac{a}{k}\right)^2\right]w_4 - \frac{k}{8}\left(1 - \frac{a}{k}\right)\left[1 - \left(\frac{a}{k}\right)^2\right]\theta_{x4}, \quad (9)$$

S5: considering the same rotation angle of each section, without considering the extrusion of longitudinal fibers of a plate-beam sub-unit, wherein the rotation angles of left and right web plates at m end around y axis are the same as those of nodes 8 and 7 around y axis, respectively, and the rotation angle of the bottom plate center around y axis is linearly interpolated between nodes 5 and 6, namely:

$$\theta_{lcm} = \frac{1}{2}\left(1 + \frac{a}{k}\right)\theta_{y1} + \frac{1}{2}\left(1 - \frac{a}{k}\right)\theta_{y4}, \quad (10)$$

$$\theta_{rcm} = \frac{1}{2}\left(1 - \frac{a}{k}\right)\theta_{y1} + \frac{1}{2}\left(1 + \frac{a}{k}\right)\theta_{y4}, \quad (11)$$

$$\theta_{bcm} = \frac{1}{2}\theta_{lcm} + \frac{1}{2}\theta_{rcm}, \quad (12)$$

S6: obtaining the displacement mode of the m end, wherein the longitudinal displacement at the centroid of the left and right web plates at the m end is:

$$u_{lcm} = u_8 - \frac{h}{2}\theta_{lcm}, \quad (13)$$

$$u_{rcm} = u_7 - \frac{h}{2}\theta_{rcm}, \quad (14)$$

where h is the height of a trapezoidal rib web plate;
the longitudinal displacement of nodes 5 and 6 is:

$$u_5 = u_8 - h\theta_{lcm} \quad (15),$$

$$u_6 = u_7 - h\theta_{rcm} \quad (16),$$

linear interpolation is performed between nodes 5 and 6 to obtain the longitudinal displacement at the centroid of the bottom plate at the m end:

$$u_{bcm} = \tfrac{1}{2}u_5 + \tfrac{1}{2}u_6 \quad (17),$$

the vertical displacement of the left and right web plates at the m end at the centroid is expressed as:

$$w_{lcm} = w_8 \quad (18),$$

$$w_{rcm} = w_7 \quad (19),$$

linear interpolation is performed between nodes 5 and 6 to obtain the vertical displacement at the centroid of the bottom plate at the m end:

$$w_{bcm} = \tfrac{1}{2}w_{lcm} + \tfrac{1}{2}w_{rcm} \quad (20);$$

S7: obtaining the displacement mode of the n end according to the method of obtaining the displacement mode of the m end in S6;

S8: obtaining the longitudinal and vertical displacements of the left web plate and the bottom plate, wherein the node displacement parameters of longitudinal and vertical displacements at the centroid of the left web plate-beam sub-unit are expressed by $u_l^*$ and $w_l^*$, respectively:

$$u_l^* = [u_{lcm} u_{lcn}]^T \quad (21),$$

$$w_l^* = [w_{lcm} \theta_{lcm} w_{lcn} \theta_{lcn}]^T \quad (22),$$

the longitudinal and vertical displacements are:

$$u_{lc} = nu_l^* = nA\delta \quad (23),$$

$$w_{lc} = mw_l^* = nB\delta \quad (24),$$

where A is the transformation matrix of $u_l^*$ and $\delta$; B is the transformation matrix of $w_l^*$ and $\delta$;

S9: obtaining the longitudinal and vertical displacements of the right web plate and the bottom plate according to the method of obtaining the longitudinal and vertical displacements of the left web plate and the bottom plate in S8;

S10: obtaining the stiffness matrix of the trapezoidal rib by using the potential energy variational method according to the displacement modes of each plate-beam sub-unit of the trapezoidal rib obtained in S4 to S9:

$$\Pi = \Pi_q + \Pi_l + \Pi_r + \Pi_b - F^{eT}\delta \quad (25),$$

where: $\Pi_q$ is the strain energy of a top plate unit; $\Pi_l$, $\Pi_r$, and $\Pi_b$ are the strain energy of the left and right web plates and the bottom plate unit of the trapezoidal rib, respectively; $F^{eT}$ is an external force load array;

the strain energy of the left and right web plates and the bottom plate unit of the trapezoidal rib is expressed as:

$$\Pi_l = \tfrac{1}{2}\int_0^d EA_l(n'u_l^*)^2 dx + \tfrac{1}{2}\int_0^d EI_{yl}(m'w_l^*)^2 dx = \tfrac{1}{2}\delta^T K_l^e \delta \quad (26),$$

$$\Pi_r = \tfrac{1}{2}\int_0^d EA_r(n'u_r^*)^2 dx + \tfrac{1}{2}\int_0^d EI_{yr}(m'w_r^*)^2 dx = \tfrac{1}{2}\delta^T K_r^e \delta \quad (27),$$

$$\Pi_b = \tfrac{1}{2}\int_0^d EA_b(n'u_b^*)^2 dx + \tfrac{1}{2}\int_0^d EI_{yb}(m'w_b^*)^2 dx = \tfrac{1}{2}\delta^T K_b^e \delta \quad (28),$$

where: $K_l^e$, $EA_l$ and $EI_{yl}$ are the stiffness matrix, the axial stiffness and the vertical bending stiffness of the left web plate of the trapezoidal rib, respectively; $K_r^e$, $EA_r$ and $EI_{yr}$ are the stiffness matrix, the axial stiffness and the vertical bending stiffness of the right web plate of the trapezoidal rib respectively; $K_b^e$, $EA_b$ and $EI_{yb}$ are the stiffness matrix, the axial stiffness and the vertical bending stiffness of the bottom plate of the trapezoidal rib, respectively;

S11: assuming that the residual stress in the top plate along the x direction is a constant $\sigma_{px0}$, and $\sigma_{sx0}$ the longitudinal residual stress $\sigma_{sx(z)}$ of the trapezoidal rib gradually changes from $\sigma_{px0}$ to $\sigma_{sx0}$ along the z direction, according to the self-balance condition of the residual stress, obtaining:

$$\tfrac{1}{2}tk\sigma_{px0} + t_1\int_0^{g_1}\tfrac{l}{g_1}\sigma_{px0}dl - t_1\int_0^{g_2}\tfrac{l}{g_2}\sigma_{sx0}dl = 0, \quad (29)$$

according to formula (29), g1 and g2 is obtained from the residual stresses $\sigma_{px0}$ and $\sigma_{sx0}$, and g1 and g2 represent the distribution width of the residual stresses in two directions, respectively, for the top plate, the initial deformation of the top plate is obtained by substituting the residual stress $\sigma_{px0}$ into the stress matrix of the plane strain unit, for the trapezoidal rib, the initial deformation of the left and right web plates is obtained by combining the stiffness matrix and the residual stress distribution of the left and right web plates, wherein the stiffness matrix of the left web plate is $K_l^e$, the stiffness matrix of the right web plate is $K_r^e$, and the residual stress is $\sigma_{sx(z)}$.

\* \* \* \* \*